Figure 1:
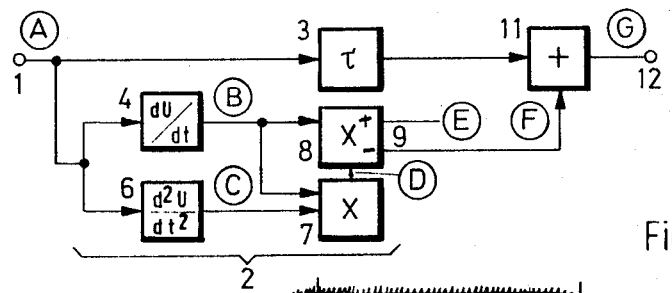

United States Patent [19]

Hess et al.

[11] 4,410,912
[45] Oct. 18, 1983

[54] METHOD OF GENERATING A VIDEO APERTURE CORRECTION SIGNAL

[75] Inventors: Heinz Hess, Wetterstadt; Reinhard Kirschenstein, Rossdorf, both of Fed. Rep. of Germany

[73] Assignee: Robert Bosch GmbH, Stuttgart, Fed. Rep. of Germany

[21] Appl. No.: 340,016

[22] Filed: Jan. 18, 1982

[30] Foreign Application Priority Data

Jan. 30, 1981 [DE] Fed. Rep. of Germany ....... 3103099

[51] Int. Cl.³ .............................................. H04N 5/14
[52] U.S. Cl. ................................................... 358/162
[58] Field of Search ................................. 358/162, 37

[56] References Cited

U.S. PATENT DOCUMENTS 4,030,121 6/1977 Faroudja.

FOREIGN PATENT DOCUMENTS 2237769 of 0000 Fed. Rep. of Germany.

OTHER PUBLICATIONS

SMP Jun. 1960, pp. 395–401 "A Vertical Aperture Equalizer for Television" by Gibson & Schroeder.

Primary Examiner—Richard Murray
Attorney, Agent, or Firm—Frishauf, Holtz, Goodman & Woodward

[57] ABSTRACT

To obtain an aperture correction signal with improved signal-to-noise ratio and having steep flanks with low harmonic content, the video signal is twice differentiated to obtain the second differential (C), and is also once differentiated to obtain the first differential (B), which is squared, the squared first differential and the second differential being multiplied and the product, after phase-matching by inversion, is applied as a correction signal (F), additively, in an adder (11) to the video signal (A) to form an aperture corrected output signal (G). Prior to the addition step, the video signal is time delayed to compensate for delays in the signal processing stages (4, 6, 7, 8) of the system (2).

7 Claims, 2 Drawing Figures

METHOD OF GENERATING A VIDEO APERTURE CORRECTION SIGNAL

The present invention relates to television pick-up technology, and more particularly to a simplified method of generating an aperture correction signal which can be superimposed on a video signal by being added thereto.

BACKGROUND

The contour sharpness of a video image in the direction of the lines can be increased by aperture correction of the image recording video signal, by twice differentiating the video signal; a variable proportion of the second differential quotient of the video signal, corresponding to the correction signal, is added to the video signal with reverse polarity. It has also been proposed—see U.S. Pat. No. 4,030,121—to increase the steepness of flanks of video signal signal jumps by applying to a four-quadrant multiplier a signal corresponding to the first differential quotient of the video signal and, after rectification, applying a signal corresponding to the second differential quotient of the video signal after amplitude limiting. The video signal corresponding to the second differential quotient acts as a switching signal to invert the first half of the video signal corresponding to the first differential quotient in time. A similar circuit is also described in German Published Patent Application DE-AS No. 22 37 769, in which, however, a signal corresponding to the square of the first differential of the video signal is generated which is inverted by a switching signal corresponding to the second differential quotient of the video signal, temporally, in the first half.

The circuits described provide correction signals which are suitably additively superimposed on the video signal to be corrected.

It has been found that the switch-over effected by the inversion generates strong harmonics which may lead to cancellation of higher frequency portions of the video signal. It has also been found that they lead to increased color ambiguities and cross-talk.

THE INVENTION

It is an object to generate an aperture correction signal which has steep flanks without, however, generating strong harmonics.

Briefly, the video signal is differentiated to obtain a first derivative signal. The video signal is also twice differentiated to obtain a second derivative signal. The correction signal is generated by multiplying the second derivative signal with the square of the first derivative signal, for example in a multiplier which has a direct and an inverting output. The correction signal is then additively superimposed on the video signal which, preferably, is time delayed by an amount equal to the delay resulting from signal processing in the differentiators and multipliers.

The method has the advantage that a correction signal is obtained which corresponds to the narrow portion of the second differential quotient and which, after superimposition on the video signal, leads to substantially steeper flanks with smaller and narrower overshoots or over-swings. The overall signal-to-noise ratio is improved since smaller signal components, when multiplied with respect to each other, are evaluated only to a minor extent.

The method is suitable for generation of horizontal correction signals as well as for vertical aperture correction signals. To generate the vertical aperture correction signal, a method utilizing simple or double line delay to generate a first and second differential quotient corresponding to the signal can be used—see "Journal of the SMPTE", June 1960, vol. 69, pp. 395 to 401.

DRAWINGS

Figure 2:
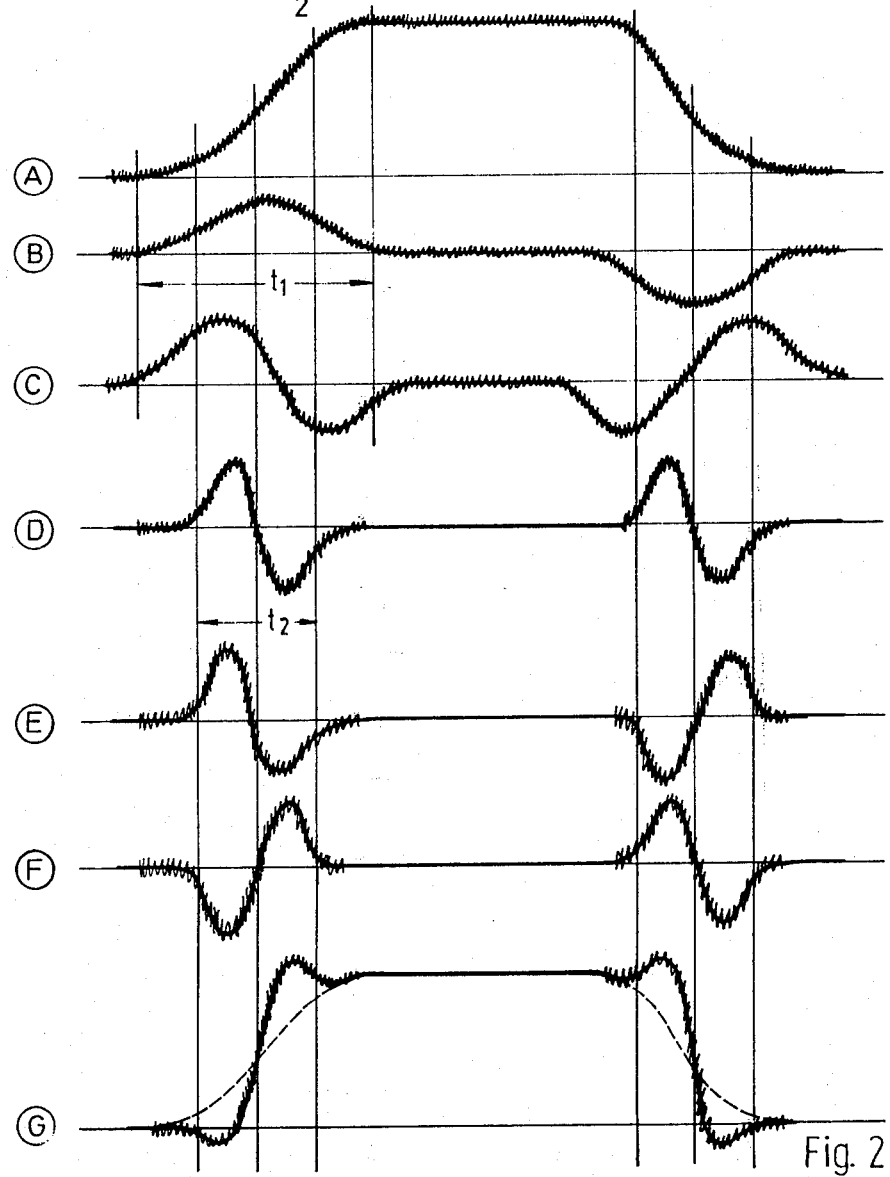

FIG. 1 illustrates a circuit suitable to carry out the method of the present invention; and FIG. 2 is a series of timing diagrams of the signals arising in the circuit of FIG. 1.

A video signal to be corrected and having the curve of graph A of FIG. 2 is applied to terminal 1 of the circuit of FIG. 1. The video signal A is then branched to be connected to the circuit 2 to generate the aperture correction signal and further to a delay line 3, introducing a time delay $\tau$.

The circuit 2 to generate the aperture correction signal has a first differentiator 4 which generates from the applied video signal the first differential quotient. The result will be the curve illustrated in graph B of FIG. 2. The signal is further applied to a double differentiator stage 6 to generate the second differential of the video signal, which is illustrated in curve C of FIG. 2. The output from the double differentiator stage 6, signal C, is connected to a multiplier 7 which, further, receives the output from the single or first differentiator 4 for multiplication of the second and first differential signal. To obtain the square of the first differential signal, the so multiplied signal is applied to a second multiplier 8 which multiplies the product from multiplier 7 once more with the output from the differentiator 4. The multiplier 8 has direct and inverting outputs + and —, respectively.

For horizontal aperture correction, the video signal is differentiated in the differentiators 4 and 6 to form the first and second differential quotient of the video signal, respectively. For a vertical aperture correction, the video signals are so combined that the outputs of the stages 4 and 6 will be signals having the wave shapes similar to the curves B and C and which correspond to the first and second vertical differential quotient of the video signal. The stages 4 and 6 will receive, respectively, an undelayed video signal as well as a video signal which is time-delayed by one or two lines, respectively, as known—see the referenced literature.

These signals are then, first, applied to the multiplier stage 7 in which the product of the signals is formed. The result will be a signal having the curve D with a substantially shorter undulation time $t_2$ than the signal of the curve B, which has a rise and fall time $t_1$. The flanks are much steeper, as is clearly apparent by comparing the graphs B and D. In this signal, by multiplication of small signal components, the horizontal portion of the signal is practically free from noise. The signal of curve D is then multiplied in multiplier 8 with the signal of curve B, resulting in the signal of curve E, in which the trailing flank is also inverted. After inverting the entire signal of the curve E, for example by taking the signal off an inverting output of multiplier 8, or passing it through a separate inverter, a signal of the curve F can be obtained which is applied to one input of an adder 11. The other input of the adder 11 receives the video signal of graph A, after being suitably delayed in the delay element 3 to compensate for the time delay in the various signal processing stages of the correction system 2, to then obtain at the output from adder 11 the signal shown in graph G, which is aperture corrected. Graph G also shows in broken line the center of the leading and trailing flanks of the signal of graph A, for comparison.

Various changes and modifications may be made, and the method may be carried out by a system instrumented differently from that shown.

We claim:

1. Method of generating an aperture correction video signal for additive correction of a video signal which includes differentiating the video signal (A) to obtain a first derivative signal (B);

twice differentiating the video signal (A) to obtain a second derivative signal (C) and further comprising the steps of generating said correction signal (F) by multiplying the first derivative signal with itself and further with the second derivative signal (C) to generate a product comprising the square of the first derivative signal (B) and said second derivative signal.

2. Method according to claim 1, wherein the signal generating step comprises multiplying the first derivative signal (B) with the second derivative signal (C) to form an intermediate product signal (D);

and then multiplying the intermediate product signal with the first derivative signal (B) to obtain the square of the first derivative signal multiplied with the second derivative signal.

3. Method according to claim 2, further including the step of time delaying the video signal (A) before carrying out the addition for a time period corresponding to the delay consequent to said differentiating and multiplying steps.

4. Method according to claim 2, further including the step of inverting the product (E) of the square of the first derivative signal (B) and of said second derivative signal (C) to form a phase matched correction signal (F) prior to adding said correction signal (F) to the video signal (A) to provide an aperture corrected video output signal (G).

5. Method according to claim 4, wherein said inverting step is carried out in a multiplier (8) having an inverting output (9).

6. Method according to claim 1, further including the step of inverting the product (E) of the square of the first derivative signal (B) and of said second derivative signal (C) to form a phase matched correction signal (F) prior to adding said correction signal (F) to the video signal (A) to provide an aperture corrected video output signal (G).

7. Method according to claim 6, wherein said inverting step is carried out in a multiplier (8) having an inverting output (9).

* * * * *